United States Patent [19]
Henrichs

[11] Patent Number: 5,152,559
[45] Date of Patent: Oct. 6, 1992

[54] LATCHING MECHANISM

[75] Inventor: Bernard Henrichs, Villa Park, Calif.

[73] Assignee: The Hartwell Corporation, Placentia, Calif.

[21] Appl. No.: 445,021

[22] Filed: Dec. 4, 1989

[51] Int. Cl.[5] .............................................. F05C 5/02
[52] U.S. Cl. ............................ 292/113; 292/DIG. 31; 292/DIG. 49
[58] Field of Search ................ 292/97, 113, DIG. 49, 292/DIG. 31, 123

[56] References Cited

U.S. PATENT DOCUMENTS

| 2,136,662 | 11/1938 | Anderson | 292/DIG. 49 X |
|---|---|---|---|
| 2,703,431 | 3/1955 | Tatom | 292/97 X |
| 2,894,777 | 7/1959 | Hogan | 292/113 |
| 2,896,751 | 7/1959 | Henrichs | 292/97 X |
| 2,961,262 | 11/1960 | Nockels | 292/113 |
| 3,174,784 | 3/1965 | Swanson | 292/113 |
| 3,437,364 | 4/1969 | Walters | 292/113 |
| 3,888,528 | 6/1975 | Jericijo | 292/113 X |
| 4,318,557 | 3/1982 | Bourne et al. | 292/113 |
| 4,828,299 | 5/1989 | Poe | 292/139 |

FOREIGN PATENT DOCUMENTS

| 819796 | 11/1951 | Fed. Rep. of Germany . |
| 2183791 | 3/1973 | France . |
| 2641952 | 7/1990 | France . |

Primary Examiner—Eric K. Nicholson
Attorney, Agent, or Firm—Lyon & Lyon

[57] ABSTRACT

A latching mechanism employing a keeper and hook mechanism. The hook mechanism is mounted by means of an overcenter mechanism to a mounting pin. The mounting pin is arranged in a slot through the body of the hook. The mutual pivot axis of the overcenter mechanism also extends in a locked position to seats located on the body of the hook. There seats are recessed in a direction perpendicular to the mutual pivot axis.

16 Claims, 4 Drawing Sheets

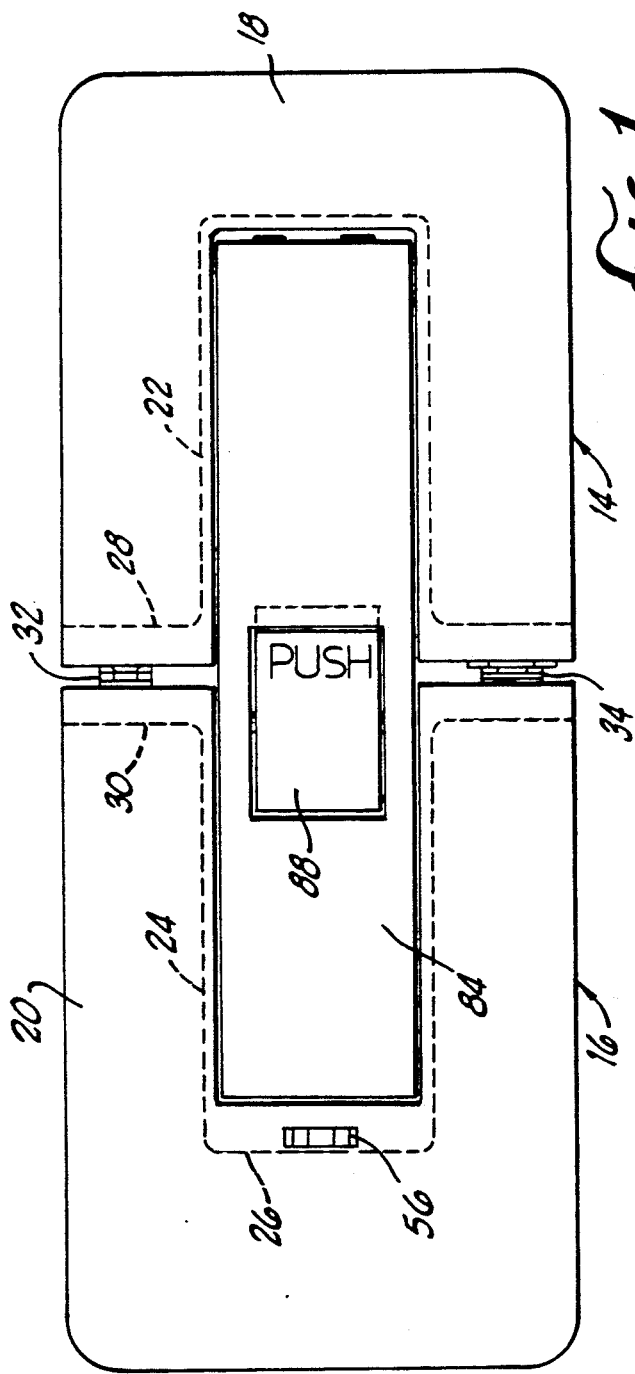
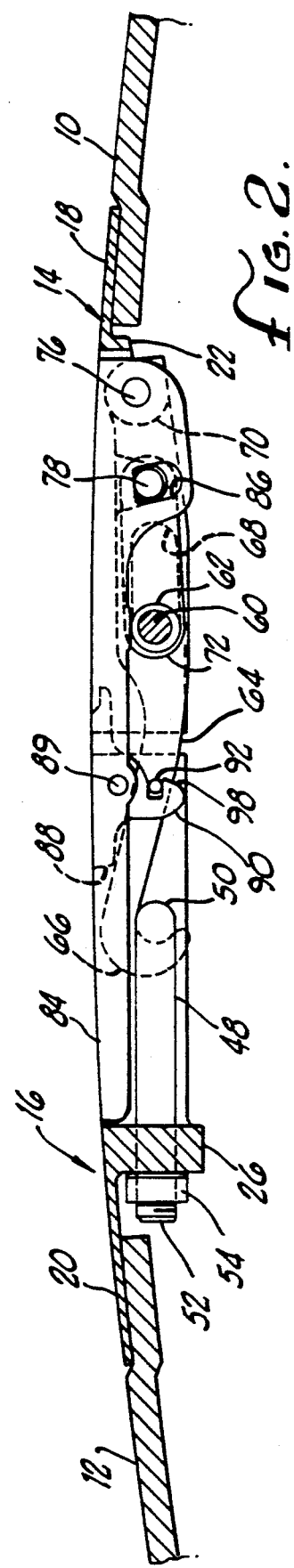

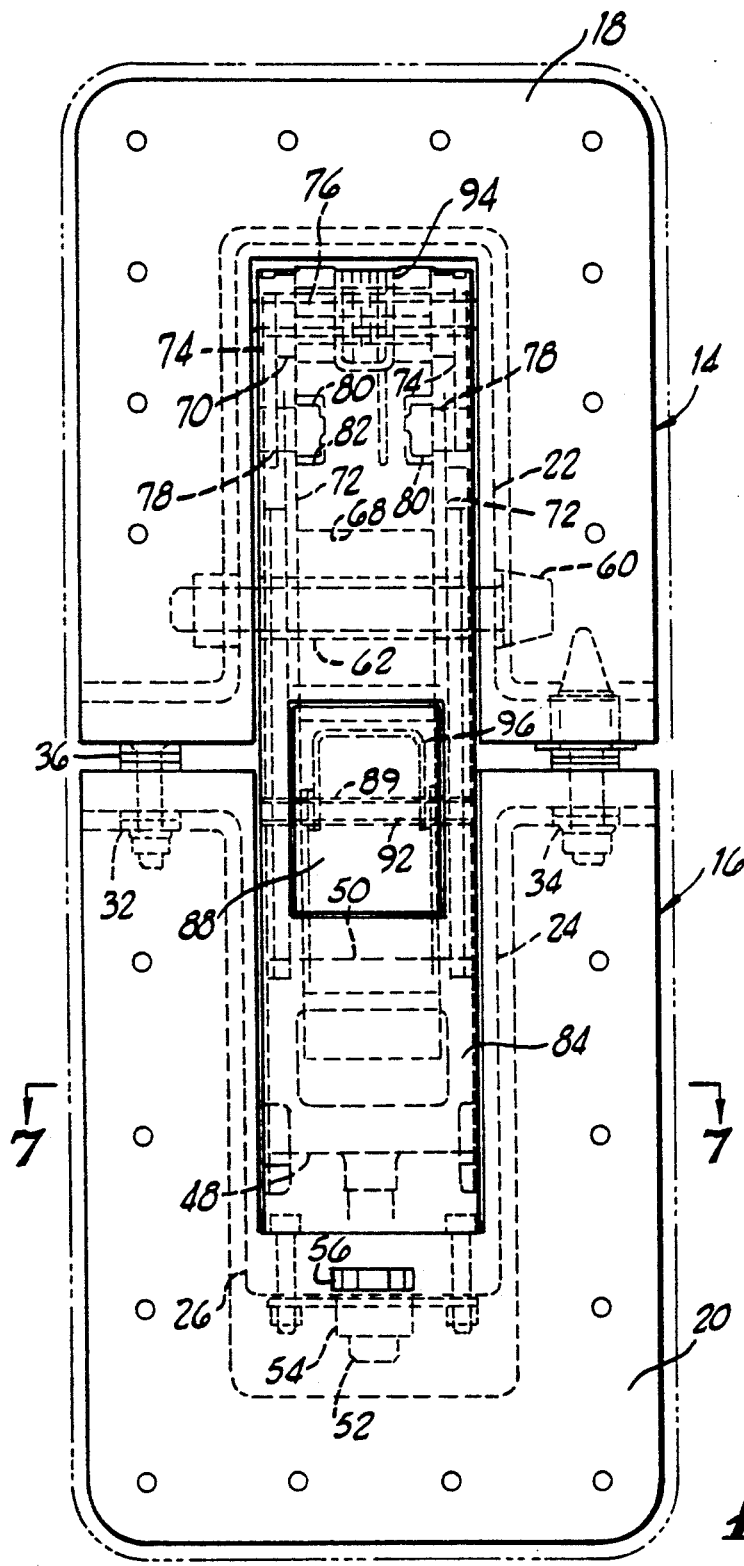
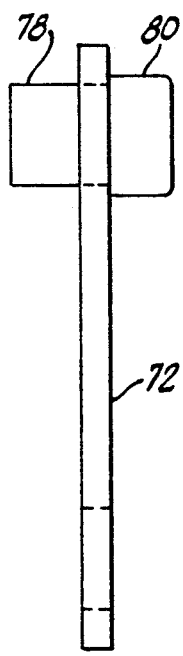
fig.12.
fig.6.

LATCHING MECHANISM

BACKGROUND OF THE INVENTION

The field of the present invention is latches for aircraft panels.

Latching mechanisms have been developed which employ a keeper, a hook to engage the keeper, mounting linkage for mounting the hook and a handle to actuate the latch through the mounting linkage. Such devices have found utility in the mounting and/or locking of aircraft panels such as engine cowlings and the like. In such devices, overcenter locking mechanisms associated with the mounting linkage establish rigid retention of the panel with the latch in a locked state. The handle controls the overcenter mechanism and is itself independently latched into place in the locked position.

In aircraft applications, the latching mechanism must provide a smooth outer surface flush with the panel, be light in weight and have a thin profile. Typically aircraft paneling is located as close as possible to both structural elements and other internal devices within the aircraft. Consequently, the smallest profile possible is advantageous. A latch presently known for aircraft panel application is disclosed in U.S. Pat. No. 4,318,557, issued Mar. 9, 1982 to Bourne et al. This patent is incorporated into the present disclosure by reference.

SUMMARY OF THE INVENTION

The present invention is directed to a latching mechanism for aircraft panels and other similar uses requiring a thin profile. The mechanism includes a keeper and a hook which are to be associated with aircraft panels or structures to be latched together. An overcenter mechanism controlled by a handle operatively mounts the hook to a mounting pin.

In a first aspect of the present invention, the body of the hook includes a slot receiving the mounting pin. The sides of the slot may thereby provide bearing surfaces upon which the hook is appropriately constrained. The mounting pin cooperates with the sides of the slot to this end. Yet the slot and pin arrangement allows longitudinal movement and rotation of the hook about the pin.

In a second aspect of the present invention, a seat is provided on the body of the hook to cooperate with a boss associated with the overcenter mechanism. This seat is recessed into the body of the hook in a direction perpendicular to the mutual pivot axis of the lengths of the overcenter mechanism.

The relative location of the mounting pin in the body of the hook and the location of the seat on the hook associated with the overcenter mechanism each contribute independently and collectively to a reduced latch profile. The relative placement of the mounting pin also assists in limiting the freedom of the hook when not engaged with the keeper even in circumstances where substantial room is available. Accordingly, it is an object of the present invention to provide an improved latch mechanism. Other and further objects and advantages will appear hereinafter.

BRIEF DESCRIPTION OF THE DRAWINGS

FIG. 1 is a plan view of a latch of the present invention.

FIG. 2 is a cross-sectional elevation taken along line 2—2 of FIG. 1.

FIG. 6 is a plan view of the latch of the present invention with the underlying elements illustrated in hidden line.

FIG. 12 is a plan view of a compression link and pin of the overcenter mechanism of the present invention.

DETAILED DESCRIPTION OF THE PREFERRED EMBODIMENT

Figure 10:
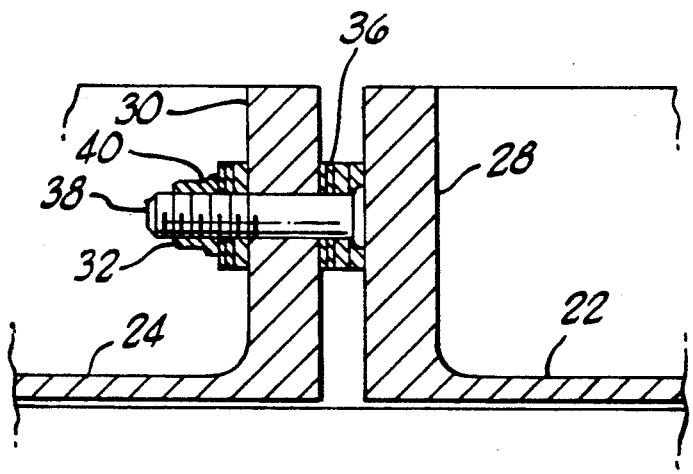
FIG. 10 illustrates a mounting seat in cross-sectional plan view which may be employed to one side of the latch.
Figure 11:
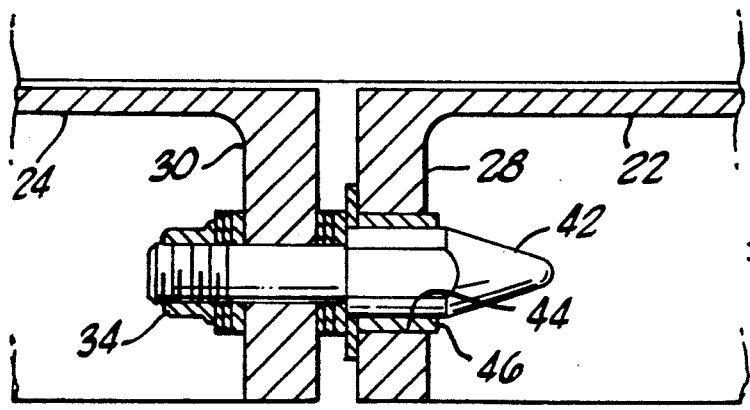
FIG. 11 illustrates a mounting seat and sheer pin in cross-sectional plan view which may also be used with the latching mechanism of the present invention.

Turning in detail to the drawings, two objects such as aircraft panels 10 and 12 are shown to be fixed to mounting frames 14 and 16. The mounting frames 14 and 16 each include a mounting flange 18 and 20, respectively, for direct attachment to a panel. Depending flanges 22 and 24 of the mounting frames 14 and 16, respectively, surround the latch mechanism. The back portion 26 of the depending flange 24 is structurally enhanced to provide mounting for a keeper. Mating flanges 28 and 30, provided on each side of the locking mechanism at the joint between sides of the latching mechanism are also structurally enhanced and accommodate seating elements 32 and 34 as best illustrated in FIGS. 10 and 11. The seating element 32 provides a flat seat defined by a series of washers 36 positioned by a bolt 38 and nut 40. The seating element 34 is similarly configured but further includes a sheer pin 42 which extends from the end of the bolt 38 and cooperates with a hole 44 having a grommet 46 positioned therein.

Figure 4:
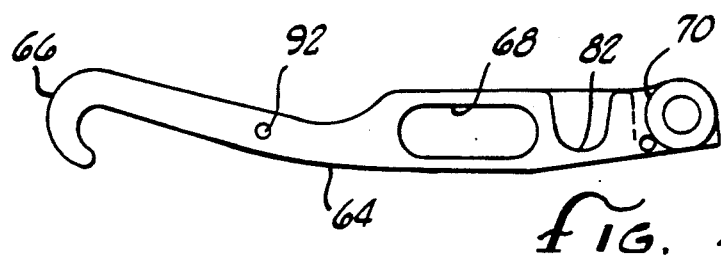
FIG. 4 is an elevation view of the hook element.
Figure 5:
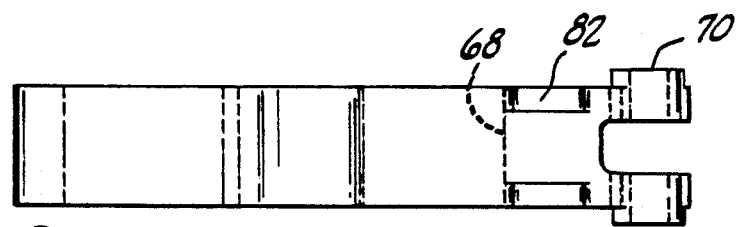
FIG. 5 is a plan view of the hook element of FIG. 4.
Figure 7:
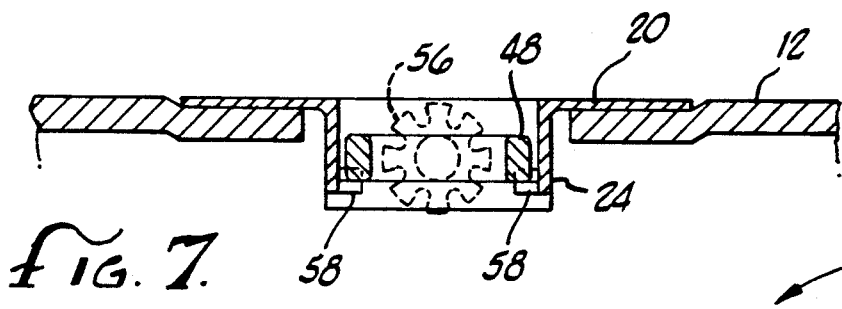
FIG. 7 is a cross-sectional end view taken along line 7—7 of FIG. 6.
Figure 3:
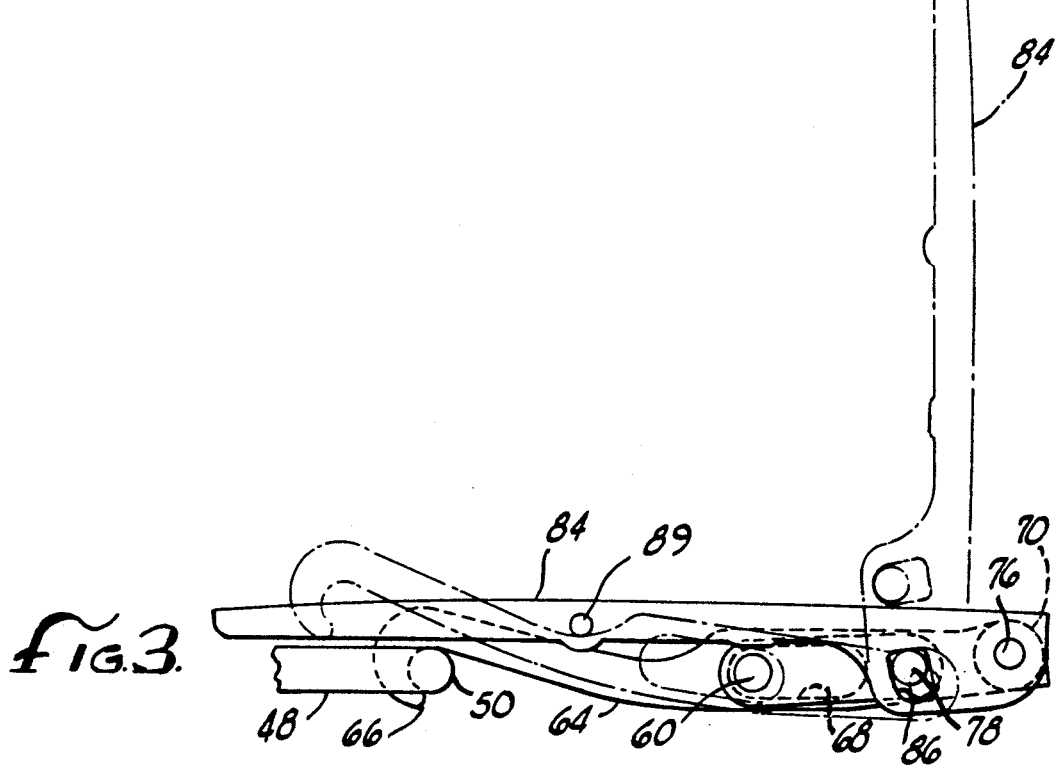
FIG. 3 is a schematic illustration of the positioning of the hook and handle illustrated in elevation with the latch locked in full line and unlocked in phantom.
Figure 8:
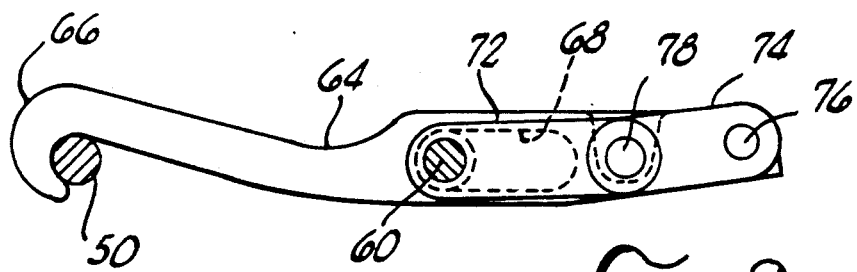
FIG. 8 is a schematic elevation view of the hook and overcenter mechanism of the present invention in its locked position.
Figure 9:
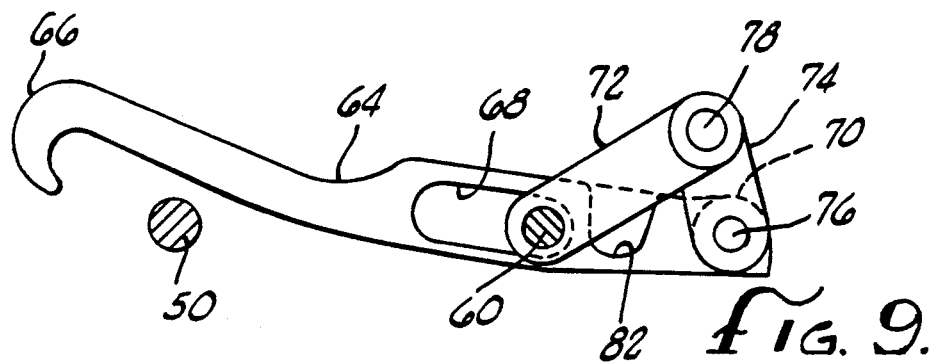
FIG. 9 is a schematic elevation view of the hook and overcenter mechanism of the present invention in its unlocked position.

Turning to the latch mechanism positioned within the mounting frames 14 and 16, a keeper 48 is coupled with the back portion 26 of the depending flange 24. The keeper 48 includes a front bar 50 for receipt of a hook. The keeper 48 is generally constructed as a clevis having a threaded element 52 cooperating with an adjustment nut 54. The adjustment nut 54 includes an adjustment wheel 56 which is exposed to the surface of the latching mechanism for manipulation by a tool. Antirotation members 58 can be seen in FIG. 7 to resist rotation of the keeper 48.

Cooperating with the keeper 48 is a hook assembly. This assembly is mounted to the mounting frame 14 by means of a mounting pin 60. The mounting pin 60 extends across the U-shaped depending flange 22. Surrounding the mounting pin 60 is a bushing 62.

Positioned about the mounting pin 60 and bushing 62 between the sides of the depending flanges 22 is a hook 64. The hook 64 includes a hook element 66 which cooperates with the bar 50 of the keeper 48. The body of the hook extends from the hook element 66 in a direction substantially away from the keeper 48. A slot 68 extends laterally through the body of the hook 64. The sides of the slot 68 are spaced apart to receive the mounting pin 60 and bushing 62 such that there is very little lateral movement of the hook 64 relative to the mounting pin 60. The slot 68 extends along the body of the hook 64 to a sufficient extent that the hook 64 is effectively unconstrained in its longitudinal movement relative to the mounting pin 60. The hook 64 also includes an integral mounting bushing 70 at an end opposite to the hook element 66. This bushing 70 extends generally parallel to the mounting pin 60 when engaged in the slot 68 of the hook 64.

Mounting the hook 64 to the mounting pin 60 is an overcenter mechanism. The overcenter mechanism includes left and right components located to either side of the hook 64. First compression links 72 are pivotally mounted at one end to the mounting pin 60. The two links 72 are arranged to either side of the hook 64. Second compression links 74 are pivotally mounted at one end to a shaft 76 positioned through the integral mounting bushing 70 of the hook 64. Again, two compression links 74 are employed and spaced apart by the hook 64. Each first compression link 72 and second compression link 74 are joined by pins 78 about a mutual pivot axis, respectively. This axis is displaced on each link from the attachments to the mounting pin 60 and the shaft 76.

Associated with the pins 78 and located to either side of the hook 64 are bosses 80. The bosses 80 are located inwardly of the links 72 and 74. The body of the hook 64 includes two seats 82 which are recessed into the hook 64 on either side thereof. These seats 82 extend down into the hook 64 in a direction perpendicular to the mutual pivot axis of the overcenter mechanism as defined by the pins 78.

A handle 84 is pivotally mounted about the shaft 76 at the integral mounting bushing 70. The handle is generally U-shaped in cross section extending down about the hook 64 and the overcenter mechanism defined by the compression links 72 and 74. On either side of the handle 84 and displaced from the mounting axis of the handle are two slots 86. The slots 86 receive the pins 78 extending outwardly from the overcenter mechanism to either side of the hook 64. These slots 86 provide lost motion between the handle 84 and the pins 78 such that the overcenter mechanism may remain in the locked condition with the handle extending upwardly from its locked, flush position. At the same time, the slots 86 prevent the overcenter mechanism from unlocking when the handle is in the flush position.

Associated with the handle 84 is a lock 88. The lock 88 is pivotally mounted to the handle 84 about a shaft 89. The lock 88 is generally U-shaped in cross section with two depending hooks 90 which cooperate with a laterally extending pin 92 in the hook 64.

To bias the elements of the locking mechanism torsional springs are employed. A first spring 94 is wrapped about the shaft 76 and is compressed between the handle 84 and the hook 64. The handle 84 is biased by the torsional spring 94 into a position displaced upwardly from a flush position. Similarly, the hook 64 is biased by the spring 94 toward the keeper 48. The torsional spring 96 is wrapped about the shaft 89 and biases the lock 88 into engagement with the pin 92. Cam surfaces 98 on the hooks 90 act to override the torsional spring 96 when the handle 84 is brought into a flush condition. Once the pin 92 passes across the cam surfaces 98, the lock 88 is returned by the torsional spring 96 to the locked condition as seen in FIG. 2.

As illustrated in the Figures, certain positional relationships exist between the various components. The mounting pin 60 defining a first pivot axis is found to be parallel to the mutual pivot axis defined by the pins 78 and to a second pivot axis defined by the shaft 76. The seats 82 receiving the bosses 80 are arranged such that when seated, the bosses are on one side of a plane passing through the first and second pivot axes. In this locked condition, this centerline of the mutual pivot axis for the overcenter mechanism is located on the opposite side of that same plane from the keeper 48. A plane defined by the first pivot axis through the mounting pin 60 and the mutual pivot axis through the pins 78 is preferably also inclined such that it passes to the same side of the keeper 48 as the plane extending through the first and second pivot axes.

Thus, an improved low profile aircraft panel latching mechanism is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A latching mechanism for joining two members, comprising
    a keeper attached to one member;
    a hook adapted to engage said keeper and having a hook portion and a body;
    a mounting pin attached to the other member;
    an overcenter linkage including a first compression link pivotally mounted to said mounting pin about a first pivot axis and a second compression link pivotally mounted to said hook about a second pivot axis, said first and second compression links being pivotally linked together at a mutual pivot axis displaced from said first and second pivot axes and constrained to move through a plane containing said first and second axes during latching, said body of said hook having a slot receiving said mounting pin.

2. The latch assembly of claim 1 wherein said slot is elongate along the length of said body of said hook.

3. The latch assembly of claim 1 wherein the sides of said slot constrain lateral movement of said hook at said mounting pin.

4. A latching mechanism for joining two members, comprising
    a keeper attached to one member;
    a hook adapted to engage said keeper and having a hook portion and a body;
    a mounting pin attached to the other member;
    an overcenter linkage including a first compression link pivotally mounted to said mounting pin about a first pivot axis and a second compression link pivotally mounted to said hook about a second pivot axis, said first and second compression links being pivotally linked together at a mutual pivot axis displaced from said first and second pivot axes and constrained to move through a plane containing said first and second axes during latching, said body of said hook having a slot receiving said mounting pin, the sides of said slot constraining lateral movement of said hook at said mounting pin and extending to permit movement of said hook without constraint along the length of said body of said hook.

5. A latching mechanism for joining two members, comprising
 a keeper attached to one member;
 a hook adapted to engage said keeper;
 a mounting pin attached to the other member;
 an overcenter linkage including a first compression link pivotally mounted to said mounting pin about a first pivot axis, a second compression link pivotally mounted to said hook about a second pivot axis, said first and second compression links being pivotally linked together at a mutual pivot axis displaced from said first and second pivot axes and constrained to move through a plane containing said first and second axes during latching, and a boss displaced from said first and second pivot axes, said hook including a seat stop to receive said boss.

6. The latch assembly of claim 5 wherein said boss is at the mutual pivot axis of said first and second compression links.

7. The latch assembly of claim 5 wherein said seat stop is recessed into said hook in a direction perpendicular to the mutual pivot axis of said first and second compression links.

8. A latching mechanism for joining two members, comprising
 a keeper attached to one member;
 a hook adapted to engage said keeper;
 a mounting pin attached to the other member;
 an overcenter linkage including a first compression link pivotally mounted to said mounting pin about a first pivot axis, a second compression link pivotally mounted to said hook about a second pivot axis, said first and second compression links being pivotally linked together at a mutual pivot axis displaced from said first and second pivot axes and constrained to move through a plane containing said first and second axes during latching, and a boss displaced from said firs and second pivot axes, said hook including a seat stop to receive said boss, said boss being at the mutual pivot axis of said first and second compression links and said seat stop being recessed into said hook in a direction perpendicular to the mutual pivot axis of said first and second compression links.

9. A latching mechanism for joining two members, comprising
 a keeper attached to one member;
 a hook adapted to engage said keeper;
 a mounting pin attached to the other member;
 an overcenter linkage including a first compression link pivotally mounted to said mounting pin about a first pivot axis, a second compression link pivotally mounted to said hook about a second pivot axis, said first and second compression links being pivotally linked together at a mutual pivot axis displaced from said first and second pivot axes and constrained to move through a plane containing said first and second axes during latching, and a boss displaced from said first and second pivot axes, said hook including a seat stop to receive said boss, said hook having a slot receiving said mounting pin.

10. The latch assembly of claim 9 wherein said slot is elongate along the length of said hook.

11. The latch assembly of claim 9 wherein the sides of said slot constrain lateral movement of said hook at said mounting pin.

12. The latch assembly of claim 11 wherein said slot extends to permit movement of said hook without constraint along the length of the body of said hook.

13. The latch assembly of claim 9 wherein said boss is at the mutual pivot axis of said first and second compression links.

14. The latch assembly of claim 9 wherein said seat stop is recessed into said hook in a direction perpendicular to the mutual pivot axis of said first and second compression links.

15. A latching mechanism for joining two members, comprising
 a keeper attached to one member;
 a hook adapted to engage said keeper;
 a mounting pin attached to the other member;
 an overcenter linkage including a first compression link pivotally mounted to said mounting pin about a first pivot axis, a second compression link pivotally mounted to said hook about a second pivot axis, said first and second compression links being pivotally linked together at a mutual pivot axis displaced from said first and second pivot axes and constrained to move through a plane containing said first and second axes during latching, and a boss displaced from said first and second pivot axes, said hook including a seat stop to receive said boss, said boss being at the mutual pivot axis of said first and second compression links and said seat stop being recessed into said hook in a direction perpendicular to the mutual pivot axis of said first and second compression links, said hook having a slot receiving said mounting pin, the sides of said slot constraining lateral movement of said hook at said mounting pin and extending to permit movement of said hook without constraint along the length of the body of said hook.

16. A latching mechanism for joining two members, comprising
 a keeper attached to one member;
 a hook adapted to engage said keeper and having a hook portion and a body, said body including a slot extending toward and away from said hook portion;
 a mounting pin attached to the other member, said mounting pin extending through said slot such that said hook is pivotable about said mounting pin and is slidable relative to said mounting pin;
 an overcenter linkage including a first compression link pivotally mounted to said mounting pin about a first pivot axis and a second compression link pivotally mounted to said hook about a second pivot axis, said first and second compression links being pivotally linked together at a mutual pivot axis displaced from said first and second pivot axes and constrained to move through a plane containing said first and second axes during latching, said first, second and mutual pivot axes being free of the other member.

* * * * *